United States Patent [19]

Reiback

[11] 3,755,664

[45] Aug. 28, 1973

[54] APPARATUS AND METHOD FOR PRODUCING REFRACTED COLOR IMAGES

[76] Inventor: Earl Martin Reiback, 20 E. 9th St., New York, N.Y.

[22] Filed: Dec. 20, 1971

[21] Appl. No.: 209,844

[52] U.S. Cl. ........... 240/10 R, 40/132 E, 40/132 G, 40/132 H, 240/10.1
[51] Int. Cl. ..................... A47g 33/16, F21p 1/02
[58] Field of Search ................ 240/10 R, 10 S, 10.1; 40/132 E, 132 G, 132 H

[56] References Cited
UNITED STATES PATENTS

| | | | |
|---|---|---|---|
| 2,322,838 | 6/1943 | Evans | 40/132 G |
| 1,515,444 | 11/1924 | Shephard | 40/132 H |
| 3,538,323 | 11/1970 | Ziegler | 240/10.1 |
| 2,026,713 | 1/1936 | Terwilliger | 40/132 E |

Primary Examiner—Samuel S. Matthews
Assistant Examiner—Monroe H. Hayes
Attorney—John Boustead et al.

[57] ABSTRACT

A method for producing an intensified pattern of continuous varying projected color images by interposing between the source of the projected color images and the viewing surface a transparent refracting material having the property of shaping the transmitted light into areas of varying intensity, and apparatus for practicing the method.

11 Claims, 5 Drawing Figures

PATENTED AUG 28 1973 3,755,664

APPARATUS AND METHOD FOR PRODUCING REFRACTED COLOR IMAGES

BACKGROUND OF THE INVENTION

1. Field of the Invention

This invention relates to a method of shaping and varying the intensity of a pattern of projected color images, which color images are themselves in motion with respect to the viewing surface. This change in the patterns of the intensity of the projected color images is brought about by the inter-position of a transparent refracting material between the projected varying color images and the viewing surface. The transparent refracting material is comprised of a smoothly undulated glass or plastic plate having areas of varying thickness and curvature which are so related as to transmit a curved, pleasing pattern of projected light which reshapes and blends the color shapes in motion into color images of varying intensity and varying apparent directions of flow, with a wide angle of projection.

2. Description of the Prior Art

Various methods have been devised for projecting moving light and color images onto walls and ceilings in an attempt to produce an aesthetically pleasing environment of changing patterns and colors. The simplest of these devices include the technique of projecting white light through transparent color fields serially which has the effect of producing an environment that varies from one primary color to the next, with the varying shades of the combined colors in between. Another method for producing a varying pattern of projected light images utilizes one or more sources of light projected on a multi-faceted rotating sphere where each of the facets is a small piece of transparent or colored reflective material such as a glass mirror. This method of diffusing and projecting the light creates an environment of discrete moving areas of bright light whose intensity will vary with the distance from the viewing surface to the particular bit of reflecting material.

The methods used to produce these varying projected images are, however, readily apparent to the observer in this environment, as is the repetitive character of the images projected, the relatively uninteresting shapes, and steady direction of flow, and for these reasons possess little if any aesthetic character.

SUMMARY OF THE INVENTION

Thus, it is an object of my invention to provide a method of producing a continuously varying pattern of projected color images of changing intensity and color.

A further object of my invention is to provide a method of producing projected color images in a continuously varying pattern in which areas of greater brightness or intensity appear to flow in a complex and unpredictable fashion on the viewing surface.

An additional object of my invention is to provide a method of producing a flowing pattern of color images of varying intensity which may be projected in a very wide angle onto a wall or ceiling or other suitable viewing surface to create an environment of aesthetically pleasing changing light and color forms.

A still further object of my invention is to provide a method of producing a continuously varying pattern of projected color images which are refracted to produce moving areas of intensified light and color.

A particular object of my invention is to provide a method of producing refracted, continuously varying color images of changing intensity whose flow and movement are complex and not easily related by the observer to the movement of the color fields which produce the color images.

My invention provides a method of producing a pattern of continuously varying projected color images of varying intensity by projecting light which has passed through a moving field of transparent color images and then through a static transparent refracting material onto a suitable reflective surface for viewing. The transparent refracting material can be generally described as a lens which in its simplest form, has a planar surface on its image side and a convoluted surface on its object side. In a preferred embodiment the convoluted or refractive surface has predominantly large areas of irregularly shaped concave surfaces with narrower regions of convex surfaces between them. The convex surfaces form a network between the concave surfaces. The use of predominately concave areas with a resultant accompanying network of convex areas between them gives a web-like shape at varying distances from the light source and the projection surface. The projected image is visually effective at any distance from the projection apparatus. The basic forms of the projected color images, which appear as areas of brightened or intensified color are the result of the concentration and spreading of the light rays which are transmitted by the refracting material.

In the absence of movement of the color field the projection of the color images through the convoluted refracting lens or element would produce a static image on the projection surface. However, when a moving color field is interposed between the light source and the refracting lens element a pleasing effect of flowing color and changing pattern is created on the projection surface.

This pattern results because the refracting element has the property of variably concentrating and focusing transmitted light thereby providing an optical system for projecting images in which the moving color field, being inherently out of focus, variably tints and colors the light projected through the refracting element so that the apparent flow of moving colors on the projection surface follows the refraction paths of the element rather than the actual direction of the motion of individual colors in the moving field.

When such a convoluted refracting element is used in conjunction with a moving planar color field containing transparent colors in virtually any pattern, the intensity of the light in the projected image seems to flow along curved paths defined by the refracting contours of the convoluted surface. The movement and flow of the projected colors is surprisingly complex when the convoluted refracting element is static. Thus, utilizing my method, an unexpected effect is produced which distinguishes my method from those of the prior art. If, for example, a disc with pie-shaped sections of transparent color is rotated between the light source and the convoluted refracting surface, the movement of light on the projection surface does not appear to rotate, but rather appears to flow along the light paths defined by the convoluted material. In other words, where a rotational color image would be obvious and unintriguing when projected, my method of interposing a convoluted refracting element produces an intricate flowing effect of light and color which is apparently unrelated to the rotational motion of the color field.

The observer is thereby presented with an aesthetically pleasing but complex pattern of moving images which has been translated from a relatively simple rotational or longitudinal movement of the color field.

DETAILED DESCRIPTION OF THE DRAWINGS

In the drawings accompanying and forming part of this specification:

Figures 1, 2, 3, 4, 5:
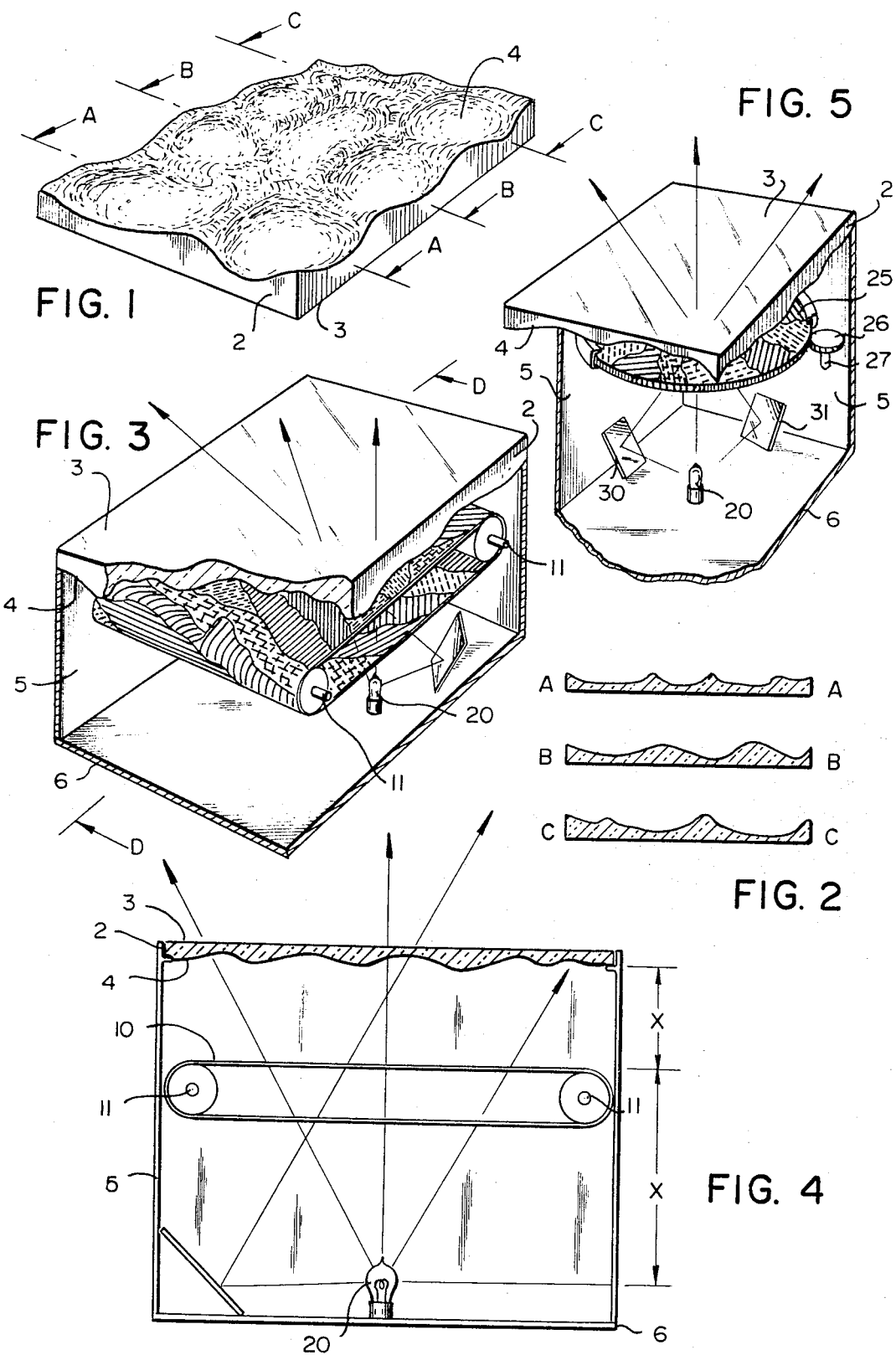
FIG. 1 is a perspective view of the convoluted refracting lens element employed in practicing the invention.
FIG. 2 shows a series of sectional views taken along the lines of section A—A, B—B and C—C as shown in FIG. 1.
FIG. 3 is a perspective view of one embodiment that can be employed in practicing the method of the invention.
FIG. 4 is a sectional view of the embodiment shown in FIG. 3 taken along section D—D, and which more clearly shows the spacial configuration of the elements shown in FIG. 3.
FIG. 5 is a perspective view showing a second embodiment for practicing the method of the invention.

Referring to the drawings in detail, wherein like reference characters designate corresponding elements throughout the several figures, and particularly to FIG. 1, there is shown the transparent convoluted refracting lens element 2, having a planar surface 3 on its image side and surface 4, on its object side, which is comprised of predominant, large areas of irregularly shaped concavities with interconnecting and relatively narrower regions of convex configuration. These convex areas can be described as forming a web-like network between the concave surfaces.

FIG. 2 shows a series of cross sections taken along section lines A—A, B—B and C—C of FIG. 1 and more clearly shows the relationship between the wider concave surfaces and the narrower intermediate convex regions. As shown in FIGS. 1 and 2 the refracting surface is comprised of a complex set of soft curves, as distinguished from the use of facets or highly variegated patterns such as are common on diffusing glass patterns.

The convoluted refracting element can be fabricated from any transparent material such as glass, plexiglass or styrene, as long as the material has the property of refracting transmitted light. A specific example of this type of convoluted refracting element, and one which is readily adaptable for practicing the method of my invention is the half glass block commonly used in the construction trade, and sold by the Pittsburg-Corning Company under the tradename "Decora."

FIG. 3 shows a preferred embodiment for practicing the method of my invention with convoluted refracting element 2 interposed between moving color field 10 and an external projection surface, which may be a wall or ceiling or other surface located at an appropriate distance for viewing and having suitable reflective properties. As shown, the various elements required for practicing the method of my invention can be conveniently positioned in a simple box-like structure 5, mounted on base 6, with non-reflective internal surfaces and equipped with appropriate mounting structures and access ports which will be obvious to those skilled in the art. Lamp 20, positioned opposite the color field 10, should approximate as nearly as possible a point-source of light, and requires a clear glass envelope with compact filament. As shown in FIG. 3 the color field is contained on an overlying endless belt 10, mounted over rollers 11 which are axially driven to produce a counter-current longitudinal movement between the upper and lower belt surfaces.

FIG. 4 which is a cross-section view of the embodiment shown in FIG. 3 taken along section line D—D, more clearly illustrates the spacial relationship between light source 20, moving color field 10 and convoluted refracting element 2, that results in producing a wide angle projected pattern. What I have found in using a convoluted refracting element, such as the half glass block discussed previously, with a surface of widely varying range of values for the radii of convex and concave curvatures, is that a random focus is achieved. Thus, in practicing the method of my invention, the refracting element can be placed at virtually any distance from the projection surface with a pleasing image resulting.

Some consideration must be given, however, to the relative distances between the light source 20, color field 10 and refracting element 2. The closer the elements 2, 10 and 20 are space together, the wider the projection angle, but also the fuzzier the image on the projection surface. If these three elements are widely spaced, the projection angle (for a given size refracting surface) decreases. Furthermore, if the color element 10, is spaced too closely to the lamp 20, it may not only suffer from the heat output of the lamp, but there is also created a diffuse flow on the projection surface, because the filament must remain relatively small with respect to the color areas, and the clarity of the intersections of color changes diminishes as the lamp approaches the color field. Furthermore, if the color field is too close to the refracting element, the flow of color on the projection surface becomes too obvious and less interesting than if spaced as described below. In a specific embodiment of the elements shown in FIGS. 3 and 4, a cube of approximately 1 foot is constructed for projection of images on a surface at a distance of about 8 feet. The lamp 20 is located centrally in the base of the unit, and the moving color field 10 is positioned so that the ratio of the distances from the upper surface to the lamp 20, and to the convoluted surface 4 of refracting element 2, X/Y, is approximately two-to-one.

With this particular configuration a pattern of images is produced, which approximates a square with 12 foot sides. It will, of course, be appreciated that the size of the projected pattern can be increased not only by changing the distance of the lamp 20 from the refracting element 2, but by changing the distance between the refracting element 2 and the projection surface.

As shown in FIG. 3, the means of creating the projected moving color field is comprised of an endless belt of transparent material 10, which moves between axially driven rollers 11. The belt may be constructed from any flexible transparent material, such as mylar or cellulose acetate, which is capable of retaining transparent color images in the form of inks, dyes, laquers, etc.

As shown, the configuration of the endless belt 10 and lamp 20, define two moving planes of color which are continuously intersecting and moving in opposite directions from each other as they intercept the light from the lamp. Thus, the projected colored light which has passed through both layers of the moving belt is the result of the combined effect produced by two color areas. This results in a constantly changing set of hues and tonalities of color which can be produced from a relatively small number of primary colors on the transparent belt. For example, when a transparent blue overlaps a transparent yellow, the light that passes through is green, although there is no green pigment used on the belt. Similarly, when a transparent red area overlaps a transparent blue area, the transmitted light is purple, although there is no purple hue printed on the belt itself. This intersecting set of color patterns which can be obtained in this manner also creates an unexpected complexity of flow directions when the projected image is viewed. The most effective type of color patterning on a belt has been found to be diagonal stripes of color going in one direction, since when both sides of the belt are viewed simultaneously, where the belt is in position on the rollers, the diagonal stripes intersect at an angle, thus creating a flow of color not only along the axis of the belt's motion, but also at right angles to this direction. This occurs because the color intersections are moving across the belt while the belt is moving around the rollers. This flow of color when transmitted and refracted by the convoluted element produces a unique and aesthetically pleasing play of color images in softly curling and expanding areas of varying intensity. One further consideration is important, and that is the relative size of the color areas to the overall geometry of the system used in practicing my method. If the color areas are too small, the images becomes dappled with color and the flow becomes less uninteresting, whereas if the color areas are too large, the flow effect becomes limited and again less interesting. Nonetheless, the relationship between the size of the color areas and the size of the refracting element, as well as the distances between the lamp, color field and refracting element can all be varied over wide ranges with a resultant variety of aesthetically satisfying projected color images.

A second preferred embodiment of practicing the method of my invention is shown in FIG. 4, where the transparent color field is carried on a rotating disc 25, which can be edge-driven by gear or friction wheel 26 that is axially mounted on shaft 27 of an electric motor (not shown). Alternatively, disc 25 can be centrally mounted directly on a motor shaft. I have found that when such a disc, 25, with wedge-shaped or striped sections of transparent color is rotated between the lamp 20, and the convoluted element 2, the movements of the images on the projection surface do not assume an obviously rotational character, but unexpectedly appear to flow along paths related to the convoluted surface 4, and produce complex color patterns of changing intensity.

Also shown in the embodiment of FIG. 5 are reflecting surfaces 30 and 31, positioned at an angle to the base 6 and adjacent the primary light source, lamp 20. Use of these reflecting surfaces, each of which produces a virtual image of the lamp filament, creates a new source of light for projection. For example, if an essentially flat mirror is placed at an angle of approximately 45° to the base, the mirror directs a portion of the light from the lamp through the refracting element 2, which would not normally have gone in that direction along that path, making the projected image more complex, and also increasing the angle of projection to increase the area of the projected images. Increasing the angle between the mirror and the base of the structure to approaching 90° tends to further substantially increase the area of the projected images. This mirror image of the lamp filament produces the effect of an additional light source, without additional cost and attendant problems of heat buildup.

If the mirror is slightly convex, it is possible to obtain a virtual image which is smaller than the filament itself, thereby creating sharper projected images, since the sharpness of the images is inversely proportional to the size of the filament. More than one mirror can be used and the number of mirrors, their placement and configuration will further determine the complexity and the flow of the projected color images that are produced using the method of my invention.

While these various parameters discussed above can be varied not only independently, but in combination, the essential purpose of the method of my invention is the aesthetic effect of the images produced, and it is thus important that these relationships be recognized.

It should be appreciated that a number of modifications could be made to the above described elements which will still be useful in practicing the method of my invention, such as increasing the complexity of images produced by the color field, varying the intensity of the light source, and the inter-position of two or more convoluted refracting surfaces; however, these modifications are clearly within the scope of the spirit of my invention.

I claim:

1. A method of shaping a projected light pattern on a remote viewing surface comprising passing light from an incandescent source through a convoluted refracting element which has the property of intensifying and diminishing the projected light along irregular fixed paths on the remote surface by virtue of negative and positive areas of curvature on the refracting element; and interposing a moving member consisting of various transparent color fields between the light source and the refracting element, the moving color fields producing a varying flow of colors along the fixed paths of light intensity on the remote viewing surface.

2. The method of claim 1 in which the moving color field is a moving endless belt of transparent material containing abstract patterns of transparent colors where the predominant direction of the color patterns is at an angle acute to the direction of motion of the belt.

3. The method of claim 1 in which the moving color field is a rotating disc of transparent material containing patterns of transparent colors.

4. The method of claim 1 in which the light is directed from a primary source and one or more deflecting surfaces.

5. The method of claim 4 where the reflecting surface is a convex mirror.

6. An apparatus for projecting on a remote viewing surface a varying pattern of color images which pattern consists of flowing color changes along fixed flow paths of various light intensities, which comprises a housing open on one end, a light source positioned within the housing, a moving transparent multi-color member, including means for moving the multi-color member contained within the housing, the multi-color member being positioned between the light source and the open end, and positioned in the open end of the housing, a transparent convoluted refracting element for establishing the fixed flow paths, said element having a surface comprising a complex set of soft curves defining areas of shallow concavities joined by irregular regions of convexities providing non-uniform focal lengths which shape the projected light into the fixed paths of various intensities on the remote viewing surface along which the color changes flow.

7. The apparatus of claim 6 in which the moving multi-color transparent element is a transparent rotating disc containing transparent color patterns.

8. The apparatus of claim 6 in which the moving multi-color transparent element is a moving endless belt of transparent colors.

9. The apparatus of claim 6 which further comprises one or more reflecting surfaces adjacent the primary light source.

10. The apparatus of claim 9 in which the reflecting surface is a convex mirror.

11. The apparatus of claim 8 in which the predominant direction of the color patterns is at an angle transverse to the direction of motion of the belt.

* * * * *